US009463602B2

(12) United States Patent
Watanabe et al.

(10) Patent No.: US 9,463,602 B2
(45) Date of Patent: Oct. 11, 2016

(54) PRODUCTION METHOD FOR HOLLOW MOLDED PRODUCT

(71) Applicants: YACHIYO INDUSTRY CO., LTD., Sayama-shi, Saitama (JP); THE JAPAN STEEL WORKS, LTD., Tokyo (JP)

(72) Inventors: Takatoshi Watanabe, Saitama (JP); Satoru Araya, Saitama (JP); Masahiro Niihori, Saitama (JP); Wataru Iwase, Saitama (JP); Naoya Tabuchi, Saitama (JP); Kazuhiro Ohtaki, Saitama (JP); Yuji Hisatomi, Kanagawa (JP); Naoto Saito, Kanagawa (JP); Naoyuki Murata, Kanagawa (JP); Ryuichi Kawachi, Kanagawa (JP); Yuji Ito, Kanagawa (JP)

(73) Assignees: YACHIYO INDUSTRY CO., LTD., Sayama-Shi, Saitama (JP); THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 15/142,413

(22) Filed: Apr. 29, 2016

(65) Prior Publication Data
US 2016/0243775 A1 Aug. 25, 2016

Related U.S. Application Data

(62) Division of application No. 14/004,224, filed as application No. PCT/JP2012/056065 on Mar. 9, 2012, now Pat. No. 9,358,740.

(30) Foreign Application Priority Data

Mar. 11, 2011 (JP) ................................. 2011-053987

(51) Int. Cl.
B29C 51/12 (2006.01)
B29D 22/00 (2006.01)
(Continued)

(52) U.S. Cl.
CPC ......... *B29D 22/003* (2013.01); *B29C 47/0054* (2013.01); *B29C 47/0066* (2013.01);
(Continued)

(58) Field of Classification Search
None
See application file for complete search history.

(56) References Cited

U.S. PATENT DOCUMENTS 5,534,218 A  7/1996 Daubenbuchel
6,866,812 B2  3/2005 Van Schaftingen
(Continued)

FOREIGN PATENT DOCUMENTS

CA  2654106 C  4/2011
CA  2798978  *  1/2012
(Continued)

OTHER PUBLICATIONS

International Search Report dated May 29, 2012 (May 29, 2012).
(Continued)

*Primary Examiner* — Edmund Lee
(74) *Attorney, Agent, or Firm* — Rankin, Hill & Clark LLP

(57) ABSTRACT

A production apparatus includes the following stations juxtaposed in the following sequence: a parison forming station for forming a parison; a built-in part attachment station where opposite sides of a center die provided with a built-in part are held between a pair of molding dies to locate the center die in the molding dies with the parison between the center die and the molding dies, and the built-in part being attached to the parison transferred to the molding dies; a molding station where the molding dies are closed to mold the hollow molded product; and a conveyance station for taking the hollow molded product out of the molding dies and conveying the hollow molded product. The center die is fixed at the built-in part attachment station, and the molding dies are configured to be movable back and forth between the built-in part attachment station and the molding station.

1 Claim, 3 Drawing Sheets

(51) Int. Cl.
*B29C 47/00* (2006.01)
*B29C 49/04* (2006.01)
*B29C 49/00* (2006.01)
*B29L 31/00* (2006.01)

(52) U.S. Cl.
CPC ......... *B29C49/0047* (2013.01); *B29C 49/04* (2013.01); *B29C 2049/0057* (2013.01); *B29K 2623/065* (2013.01); *B29L 2031/7172* (2013.01)

(56) References Cited

U.S. PATENT DOCUMENTS

| | | | | |
|---|---|---|---|---|
| 7,922,949 | B2* | 4/2011 | Borchert | B29C 49/20 156/217 |
| 8,287,796 | B2* | 10/2012 | Buchholz | B29C 66/61 264/267 |
| 8,603,280 | B2* | 12/2013 | Borchert | B29C 51/12 156/243 |
| 8,858,217 | B2* | 10/2014 | Bienhuls | B29C 33/30 425/541 |
| 2001/0009703 | A1 | 7/2001 | Toshikawa | |
| 2008/0006625 | A1* | 1/2008 | Borchert | B29C 65/609 220/4.13 |
| 2009/0308881 | A1 | 12/2009 | Eulitz et al. | |
| 2009/0309270 | A1* | 12/2009 | Buchholz | B29C 51/12 264/544 |

FOREIGN PATENT DOCUMENTS

| | | | |
|---|---|---|---|
| CN | 101489759 A | | 7/2009 |
| JP | 2001-198972 A | | 7/2001 |
| JP | 2009-525204 | | 7/2009 |
| WO | WO 03/097330 | * | 11/2003 |
| WO | 2007/088200 | | 8/2007 |

OTHER PUBLICATIONS

European Search Report dated Sep. 2, 2014, 5 pages.

\* cited by examiner

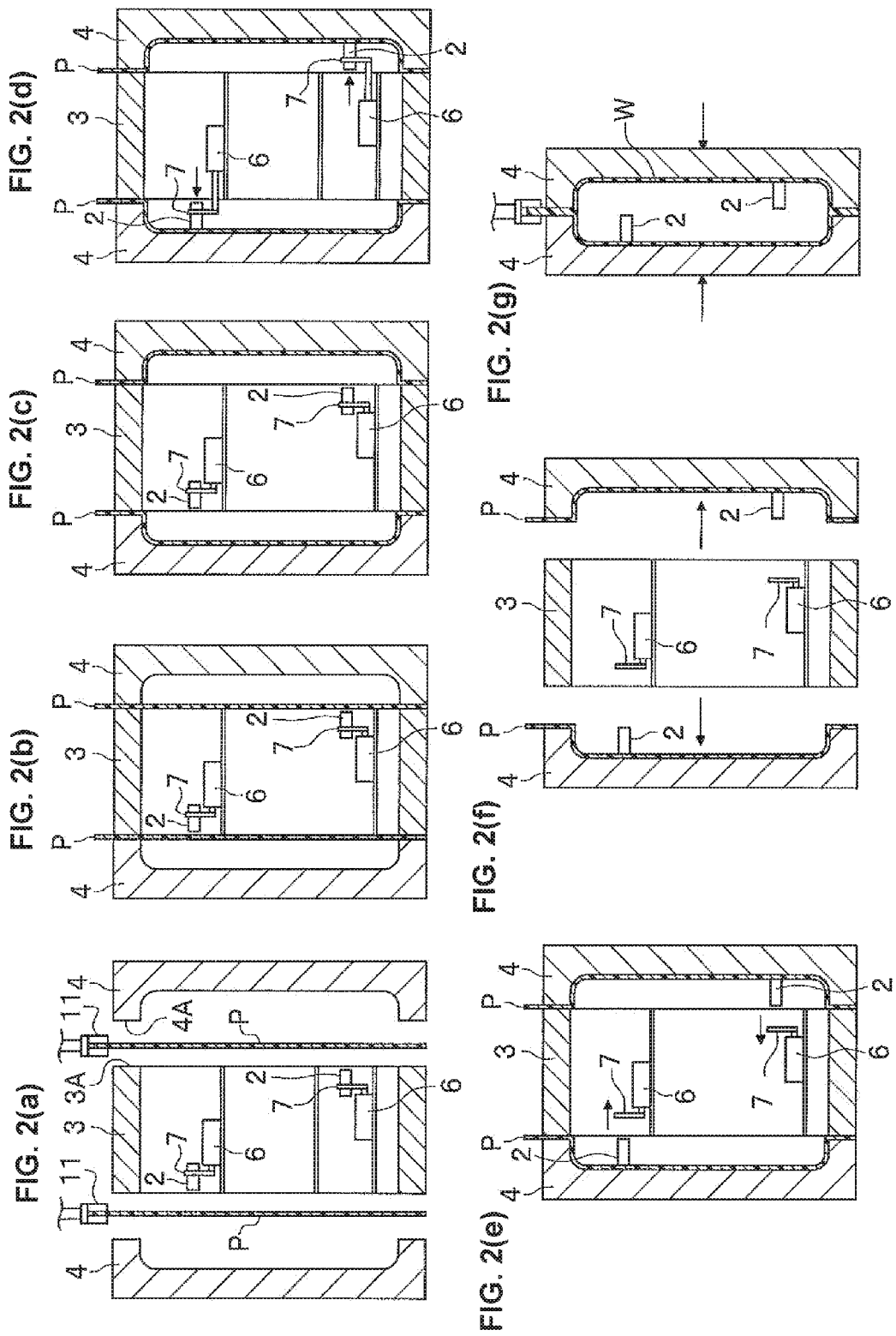

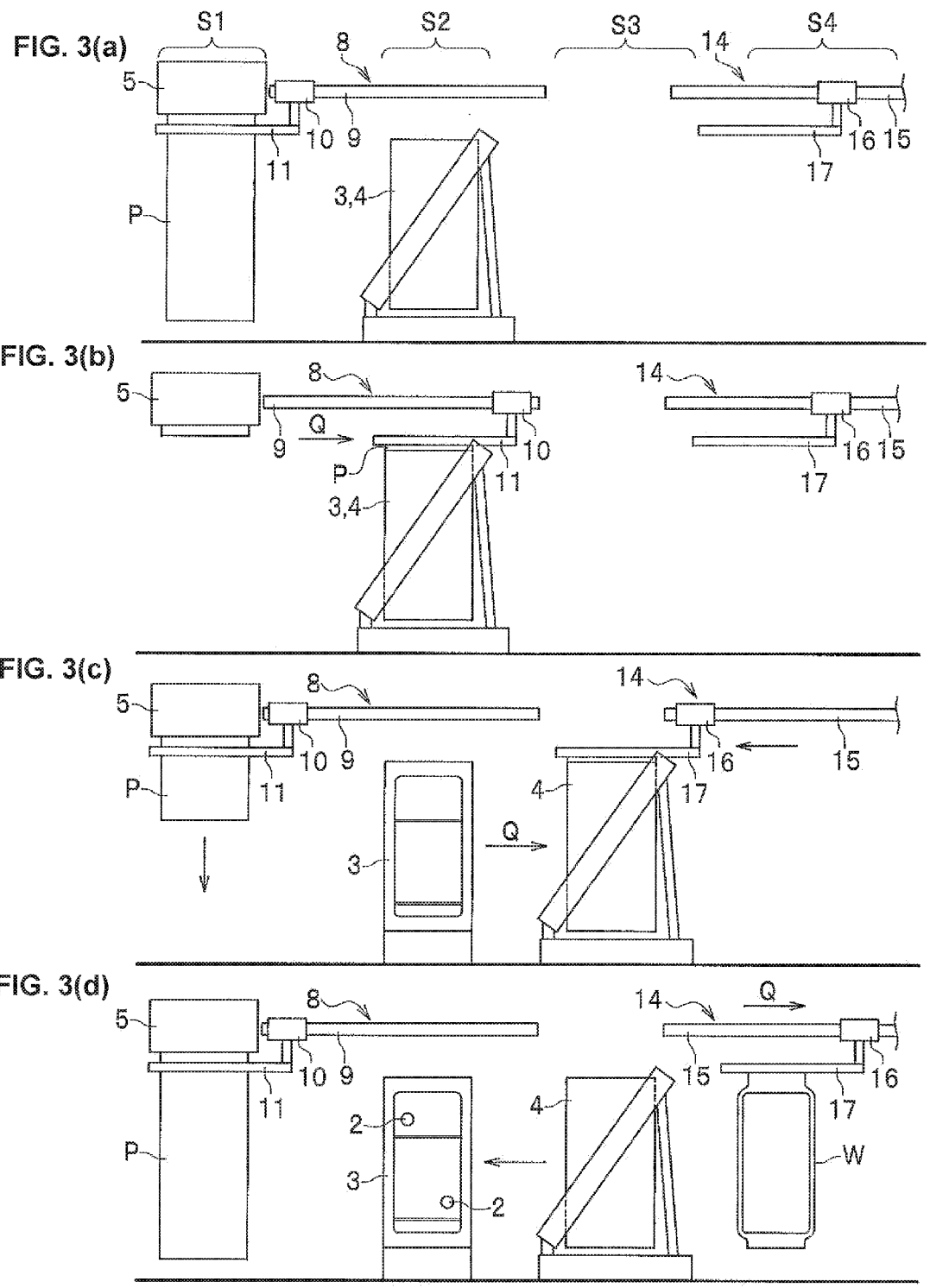

PRODUCTION METHOD FOR HOLLOW MOLDED PRODUCT

CROSS REFERENCE TO RELATED APPLICATIONS

The present invention is a Divisional of U.S. patent application Ser. No. 14/004,224, filed Sep. 10, 2013, now U.S. Pat. No. 9,358,740.

TECHNICAL FIELD

The present invention relates to a production apparatus and method for producing a hollow molded product like a fuel tank to be mounted on a car.

BACKGROUND ART

Various parts to be attached to the fuel tank like a part related to a valve or a pump, a part to secure the strength of the fuel tank, a part to control a ruffle of fuel, and so on are equipped in the fuel tank for a car. Time and labor over an installation work should be considered when these built-in parts are attached to an inner surface of the fuel tank. In consideration for this, it is preferable that these parts are attached to the fuel tank during a production process for producing the fuel tank in comparison with a method for attaching them to the fuel tank after the fuel tank has been molded.

There is a method described in a patent document 1 as an example of a prior art for attaching a built-in part to the fuel tank by utilizing a production process for producing the fuel tank. A method for producing the fuel tank is described in this document. This document describes that the production method comprises a step of providing a core with a built-in part; a step of carrying in the core between dies on which a parison is previously pressed; a step of fixing the built-in part to the parison by using the core; a step of molding the fuel tank in a state that the dies are closed again after the core is taken out; and a step of taking out the fuel tank from the dies. Furthermore, a technology capable of moving the core between a first core stop position and a third core stop position via a second core stop position is described. The first core stop position is a position for providing the core with a built-in part. The second core stop position is positioned between the first core stop position and the dies, and is a position for pre-heating and/or inspecting the built-in part provided in the core. The third core stop position is a position for the dies to close.

It seems that the dies and the core are moved up to under an extrusion device for extruding a parison, and the dies and the core close with the parison held by the dies and the core, and then the dies and the core return back to the third core stop position to carry out the step of fixing the built-in part, according to this document.

PRIOR ART DOCUMENT

Patent Document

Patent document 1: Unexamined Japanese patent publication No. 2009-525204

SUMMARY OF THE INVENTION

Problems to be Solved by the Invention

According to the technology described in the patent document 1, the dies also move back and forth along a movement path of the core while the core moves back and forth. Therefore, a control unit for controlling the movements of the dies and the core so as to operate interconnectedly is needed. So there is a problem that the control circuit of the control unit tends to be complex.

The present invention has been created to solve the aforementioned problem. And it is an object of the present invention to provide a production apparatus and method for producing a hollow molded product to allow simple control for dies.

Means for Solving the Problem

In order to solve the problem, a production apparatus for producing a hollow molded product according to the present invention comprises the following stations juxtaposed in the following sequence from one end of the production apparatus: a parison forming station for forming a parison; a built-in part attachment station in which opposite sides of a center die provided with a built-in part are held between a pair of molding dies to locate the center die in the molding dies with the parison between the center die and the molding dies, and the built-in part is attached to the parison transferred to the molding dies; a molding station in which the molding dies are closed to mold the hollow molded product; and a conveyance station for taking the hollow molded product out of the molding dies and conveying the hollow molded product. The center die is fixed at the built-in part attachment station, and the molding dies are configured to be movable back and forth between the built-in part attachment station and the molding station.

Furthermore, a production method for producing a hollow molded product according to the present invention comprises a parison carrying-in step of carrying in a parison along one direction to opposite sides of a center die provided with a built-in part; a built-in part attachment step in which the opposite sides of the center die are held between a pair of molding dies to locate the center die in the molding dies with the parison between the center die and the molding dies, and the built-in part is attached to the parison transferred to the molding dies; a molding die movement step of moving the molding dies along the one direction to a prescribed position after the built-in part is attached; a molding step in which the molding dies are closed and the hollow molded product is molded at the prescribed position; and a conveyance step of conveying the hollow molded product taken out of the molding dies along the one direction.

Owing to the apparatus or method for producing a hollow molded product according to the present invention, only the molding dies out of the molding dies and the center die are moved back and forth. Therefore, control of these dies is easy, and a hollow molded product can be produced by a simple control unit. Furthermore, structures of those dies become simple because the number of movable parts decreases. In the result, a manufacturing cost of those dies can be lowered, and the maintenance activities also can be simplified.

Furthermore, the apparatus for producing a hollow molded product according to the present invention further comprises a parison carrying-in device which is configured to be movable back and forth between the parison forming station and the built-in part attachment station, and carries in the parison formed in the parison forming station to the opposite sides of the center die while gripping the parison.

According to this invention, the parison can be carried in by a simple structure device, so that a manufacturing cost for the apparatus can be lowered.

Effect of the Invention

According to the present invention, control of the dies is easy, and a hollow molded product can be produced by a simple control unit. Furthermore, structures of the dies become simple to lower also a manufacturing cost of the dies and to simplify also maintenance activities because the number of movable parts decreases.

BRIEF DESCRIPTION OF THE DRAWINGS

FIGS. 2(a)-2(f) are cross-sectional elevation views showing a built-in part attachment step, and FIG. 2(g) is a cross-sectional elevation view showing a molding step; and FIGS. 3(a)-3(d) are elevation views showing operations of the apparatus for producing a hollow molded product according to the present invention.

MODE FOR CARRYING OUT THE INVENTION

Figure 1:
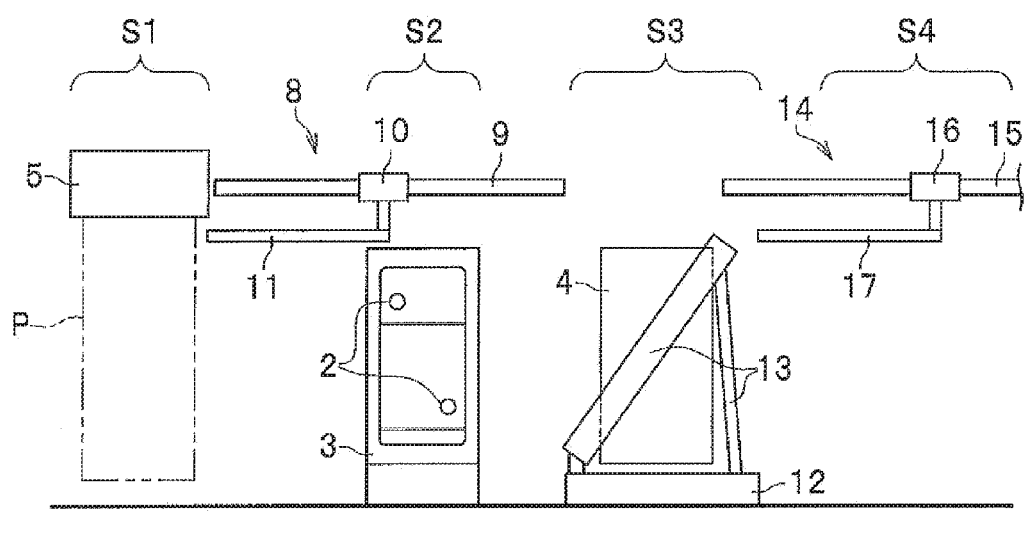
FIG. 1 is an elevation showing a structure of an apparatus for producing a hollow molded product according to the present invention.

A hollow molded product of an object of the present invention is molded by blow molding. A fuel tank or the like to be mounted on a car is an example of the hollow molded product. As shown in FIG. 1, an apparatus 1 for producing the hollow molded product according to the present invention comprises the following four stations juxtaposed in a line in the following sequence: a parison forming station S1 for forming a parison P; a built-in part attachment station S2 in which opposite sides of a center die 3 provided with a built-in part 2 are held between a pair of molding dies 4 to locate the center die 3 in the molding dies 4 with the parison P between the center die 3 and the molding dies 4, and the built-in part 2 is attached to the parison P transferred to the molding dies 4; a molding station S3 in which the molding dies 4 are closed to mold the hollow molded product W (FIG. 2); and a conveyance station S4 for taking the hollow molded product W out of the molding dies 4 and conveying the hollow molded product W.

[Parison Forming Station S1]

The parison forming station S1 is provided with a parison extrusion device 5. The parison P extruded from the parison extrusion device 5 is formed to be a pair of plate-like parisons P (refer to FIG. 2), so that each plate-like parison is finally located between the center die 3 and the corresponding left or right die of the molding dies 4. As the parison extrusion device 5, for example, a device with the general-purpose structure can be used. The device with the general-purpose structure is constructed so that melted resin for the parison P is extruded through an annular resin path formed between a central mandrel and outer die(s) to become a cylindrical parison. In this case, a cutter or the like is set under the parison extrusion device 5. And the cutter divides the parison P hanging down in the cylindrical shape into two segments at the central position of the parison. Each segment of half-cylindrical shape is deformed into a rough plate-like segment by using rollers or the like to hang down the rough plate-like segment. Another type of parison extrusion device 5 may be used. This device 5 has a pair of linear resin paths instead of the annular resin path, and extrudes resin for the parison P through each resin path to initially form a plate-like shape.

In the case in which the hollow molded product W is a fuel tank for a car, the parison P has a multi-layered structure in which a barrier layer made of a material superior in anti-permeability of fuel is sandwiched at least between an inner layer of thermoplastic resin forming an inner face of the tank and an outer layer of thermoplastic resin forming an outer face of the tank. Material of the inner layer of thermoplastic resin and the outer layer of thermoplastic resin is, for example, PE (high density polyethylene) superior in thermofusion characteristics and moldability.

[Built-In Part Attachment Station S2]

The built-in part attachment station S2 is provided with the center die 3. This center die 3 is fixed. The center die 3 has contact faces 3A formed on left and right sides of the die as shown in FIG. 2. Cylinders 6 are equipped in the hollow interior of the center die, and each cylinder is an actuator to attach the built-in part 2 to the parison P. FIG. 2 shows an example that the built-in part 2 is attached to each of the parisons P on both sides. A clamp mechanism 7 is equipped at the end of the rod of each cylinder 6. The built-in part 2 is held by the rod of the cylinder 6 via the clamp mechanism 7. A detailed explanation of the clamp mechanism 7 is omitted as it is far from the aim of the present invention.

A parison carrying-in device 8 is provided between the parison forming station S1 and the built-in part attachment station S2 as shown in FIG. 1. The device 8 is movable back and forth between the both stations, and carries in the parison (parisons) P formed in the parison forming station S1 to the both sides of the center die 3 while gripping parisons P. For example, the parison carrying-in device 8 includes a linear guide rail 9 lengthened from the parison forming station S1 to the built-in part attachment station S2 in a position above the center die 3, and a parison conveying device 10 to move on the guide rail 9. The parison conveying device 10 includes a grip mechanism 11 having a pair of bars to grip the upper portion of each parison P as shown in FIG. 2(a). After the grip mechanism 11 grips the parisons P hanging down from the parison extrusion device 5 in the parison forming station S1, a cutter (not shown) divides each parison P at a position above the grip portion of the grip mechanism 11 into an upper and a lower parts. And the parison conveying device 10 conveys the divided lower parisons P to the both sides of the center die 3 while gripping the lower parisons.

[Molding Station S3]

In FIG. 1, the molding station S3 is an area to mold the hollow molded product W while the molding dies 4 are closed. The molding dies 4 are set to be movable linearly, back and forth between the built-in part attachment station S2 and the molding station S3 along constructed guide rail(s) (not shown). The symbol 12 designates a base to move along the guide rail(s) not shown, and the symbol 13 designates support members supporting the molding dies 4.

[Conveyance Station S4]

The conveyance station S4 is provided with a molded product conveyance device 14 to take the hollow molded product W out of the molding dies 4 and to convey it. For example, the molded product conveyance device 14 includes a linear guide rail 15 lengthened from the molding station S3 to the conveyance station S4 in a position above the molding dies 4, and a molded product conveyance unit 16 to move on the guide rail 15. The molded product conveyance unit 16 includes a grip mechanism 17 to grip an upper portion of a pinch-off portion protruding from the molding dies 4 as shown in FIG. 2(*g*).

A method for producing the hollow molded product W by using the above-mentioned production apparatus 1 will be explained.

[Parison Carrying-In Step]

The parison conveying device 10 grips the parison P via the grip mechanism 11 as shown in FIG. 3(*a*). The parison P has the amount of resin needed to mold the hollow molded product W and is extruded from the parison extrusion device 5. And the parison conveying device 10 carries in the parisons to the both sides of the center die 3 provided with the built-in parts 2 along one direction (direction Q) (the state of FIG. 3(*b*)). The molding dies 4 are also positioned on the both sides of the center die 3 at the time when the parisons P are carried in or almost simultaneously.

[Built-In Part Attachment Step]

Referring to FIG. 2, the parisons P are carried in to the both sides of the center die 3 via the above-mentioned parison carrying-in step as shown in FIG. 2(*a*), and then the molding dies 4 on the left and right sides hold the center die 3 via the parisons P between the center die and the molding dies as shown in FIG. 2(*b*). Spaces enclosed with molding faces of the molding dies 4 and the parisons P are tightly closed by holding whole circumferences of end portions of the parisons P with the contact faces 4A of the molding dies 4 and the contact faces 3A of the center die 3. In this condition, air in the spaces is absorbed through the molding faces of the molding dies 4, and then blowing is executed, so that the parisons P are transferred to the molding faces of the molding dies 4 as shown in FIG. 2(*c*). Next, as shown in FIG. 2(*d*), rods of the cylinders 6 go ahead by predetermined lengths, so that an end portion of each built-in part 2 is pressed to the parison P to be buried in predetermined depth. Hereby, the built-in parts 2 are attached to the parisons P. After the built-in parts 2 are attached, clamping by each clamp mechanism 7 is released, and a rod of each cylinder 6 is retracted.

[Molding Die Movement Step]

After the built-in parts 2 are attached, the molding dies 4 are opened in a left-right direction as shown in FIG. 2(*f*), and then the molding dies 4 are moved up to the forming station S3 (predetermined position) in the one direction, that is, in the direction Q as shown in FIG. 3(*c*).

[Molding Step]

Next, as shown in FIG. 2(*g*), the molding dies 4 close, and air is blown into the parisons at the forming station S3, so that the parisons P are formed to be a hollow molding product W.

Furthermore, during the above-mentioned molding step, for example, built-in parts 2 for the next hollow molding product W are provided in the center die 3. As a way for providing the built-in parts, for example, the built-in parts 2 are automatically loaded into the clamp mechanisms 7 in the center die 3 by using a robot arm or the like and are held by the clamp mechanisms 7. So much time is not needed for loading and holding the built-in parts if the robot arm is used. This operation of loading and holding the built-in part 2 can be completed during the molding step even if a time for inspecting the result of the loaded status by using a sensor or the like is included. Needless to say, it may be allowable to provide a built-in part 2 in the center die 3 by one's hand.

[Conveyance Step]

The molded product conveyance unit 16 grips the upper portion of the pinch-off portion protruding from the molding dies 4 via a grip mechanism 17 while the molding dies 4 close in the molding step. Therefore, the hollow molding product W separated from the molding dies 4 after the molding dies 4 are opened in the left-right direction is conveyed in the one direction, that is, in the direction Q to be sent to the next step while gripped by the grip mechanism 17 as shown in FIG. 3(*d*). The molding dies 4 are moved again to the both sides of the center die 3.

The production apparatus 1 according to the present invention comprises the following stations juxtaposed in the following sequence: a parison forming station S1 for forming a parison P; a built-in part attachment station S2 in which opposite sides of a center die 3 provided with a built-in part 2 are held between a pair of molding dies 4 to locate the center die 3 in the molding dies 4 with the parison P between the center die and the molding dies, and the built-in part 2 is attached to the parison P transferred to the molding dies 4; a molding station S3 in which the molding dies 4 are closed to mold the hollow molded product W; and a conveyance station S4 for taking the hollow molded product W out of the molding dies 4 and conveying the hollow molded product. The center die 3 is fixed at the built-in part attachment station S2, and the molding dies 4 are configured to be movable back and forth between the built-in part attachment station S2 and the molding station S3. By using this structure, a method for producing a hollow molded product w comprising the parison carrying-in step, the built-in part attachment step, the molding die movement step, the molding step and the conveyance step can be constructed. In the consequence, the following effects are brought in.

(1) Control of the dies becomes easy because only the molding dies 4 out of the molding dies 4 and the center die 3 are moved back and forth. Therefore, a hollow molding product W can be produced by a simple control unit. Furthermore, the structure of the dies becomes simple because the number of movable parts decreases. In the result, the manufacturing cost of the dies can be lowered, and the maintenance activities for the dies also can be simplified.

(2) The center die 3 is fixed at the built-in part attachment station S2, and the molding dies 4 are configured to be capable of moving back and forth between the built-in part attachment station S2 and the molding station S3 in the present invention. A carrying-in path for a parison P becomes short in comparison with an imagined case that the center die 3 is configured to be capable of moving back and forth and the molding dies 4 are fixed.

That is, in the case that the center die 3 is configured to be capable of moving back and forth and the molding dies 4 are fixed, the center die 3 will interfere with a space for conveying the hollow molding product W if the center die 3 is retreated toward the conveyance station S4 when the center die 3 is retreated from the molding dies 4 after the built-in part 2 is attached to the parison P. Therefore, the center die 3 cannot help being retreated toward the parison forming station S1. And furthermore, if the center die 3 is retreated up to the parison forming station S1, the step of forming parison P and the step of providing the center die with the built-in parts 2 cannot be done simultaneously. Therefore, the center die 3 should be retreated to a position between the parison forming station S1 and the molding dies 4. That is, this case's layout is a layout for which a retreat space for the center die 3 to be retreated is needed between the parison forming station S1 and the molding dies 4. Therefore, the path for carrying in the parison P from the parison forming station S1 to the molding dies 4 becomes a long path including in the middle of the path the retreat space for the center die 3 to be retreated.

In contrast, the present invention allows a short path from the parison forming station S1 to the built-in part attachment station S2 adjacent to the parison forming station, apparently as shown in FIGS. 3(*a*) and 3(*b*). The shorter the time for which the parison P is exposed to air is, the better it is in view of the temperature control for the parison P. Therefore, the temperature control and the temperature analysis become easy to be done according to the present invention.

Furthermore, in the case that the production apparatus 1 comprises the parison carrying-in device 8 which is provided between the parison forming station S1 and the built-in part attachment station S2, is configured to be capable of moving back and forth, and carries in the parisons P formed at the parison forming station S1 to the both sides of the center die 3 while gripping the parisons, the parisons P can be carried in through the simple structure, so that the manufacturing cost of the apparatus can be lowered.

Preferable embodiments of the present invention have been described in the above. However the present invention is not limited to that shown in Figures, and can be properly modified within the aim of the present invention.

DESCRIPTION OF THE SYMBOLS

1 Production apparatus for producing hollow molded product
2 Built-in part
3 Center die
4 Molding dies
5 Parison extrusion device
8 Parison carrying-in device
14 Molded product conveyance device
P Parison
S1 Parison forming station
S2 Built-in part attachment station
S3 Molding station
S4 Conveyance station
W Hollow molding product

What is claimed is:

1. A production method for a hollow molded product, comprising:
   a parison carrying-in step of carrying a parison formed at a parison forming station along one direction to opposite sides of a single center die provided with a built-in part and installed at a fixed position;
   a built-in part attachment step in which the opposite sides of the center die are held between a pair of molding dies to locate the center die in the molding dies with the parison between the center die and the molding dies, the parison being supplied from the parison forming station and the parison being in a state before being transferred to the molding dies, and then the built-in part is attached to the parison transferred to the molding dies;
   a molding die movement step of moving the molding dies along the one direction to a prescribed position after the built-in part is attached;
   a molding step in which the molding dies are closed and the hollow molded product is molded at the prescribed position; and
   a conveyance step of conveying the hollow molded product taken out of the molding dies along the one direction.

* * * * *